No. 85,724.  R. BING.  PATENTED JAN. 12, 1869.
WATER WHEEL.

Witnesses.
Isaac R. Oakford.
Henry Roellig.

Inventor.
Robert Bing
Geo C. H. Evans
Atty.

ROBERT BING, OF MAY'S LANDING, NEW JERSEY.

Letters Patent No. 85,724, dated January 12, 1869.

IMPROVED WATER-WHEEL.

The Schedule referred to in these Letters Patent and making part of the same.

*To all whom it may concern:*

Be it known that I, ROBERT BING, of May's Landing, county of Atlantic, and State of New Jersey, have invented a new and useful Improvement in Water-Wheels; and I do hereby declare that the following is a full, clear, and exact description of the construction and operation of the same, reference being had to the accompanying drawings, making a part of this specification, in which—

Figure 1:
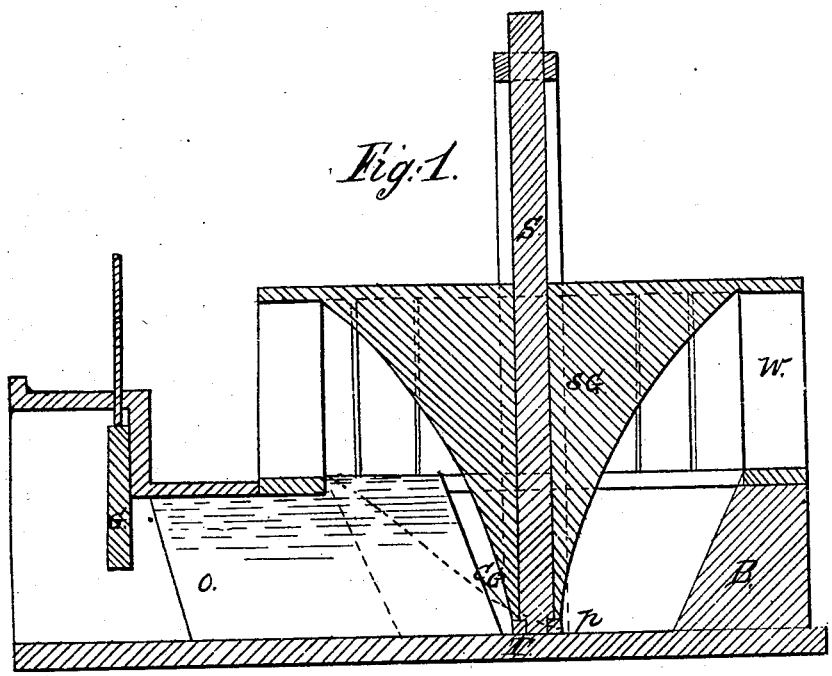
Figure 1 is a vertical section of my improvement in water-wheels.
Figure 2:
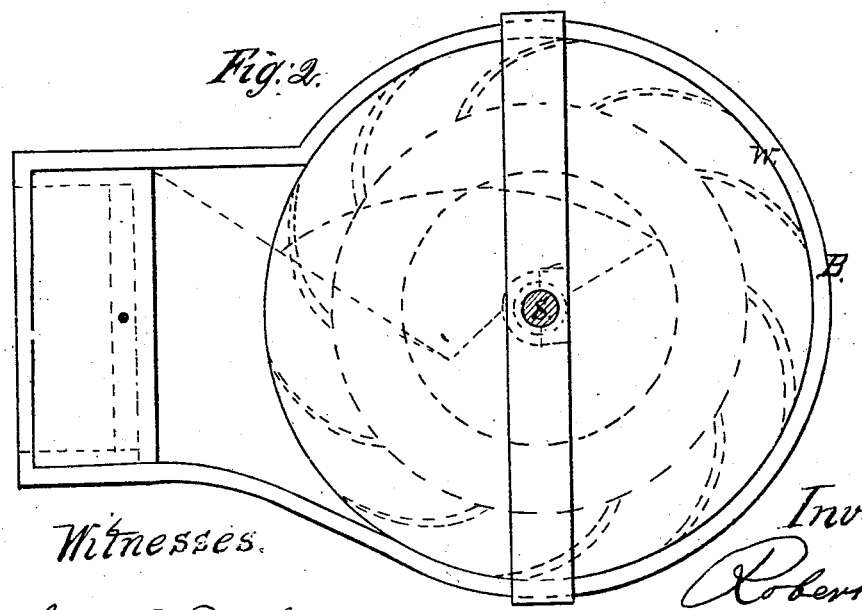
Figure 2 is a plan view of same.

My invention relates to that class of water-wheels known as the turbine, and consists in arranging a cone-shaped guide in the centre of the wheel, and conducting the water on to the wheel in the form of a spiral, thereby lessening the friction and gaining-power. Also, from its simplicity of construction, the liability of getting out of order is greatly lessened.

To enable those skilled in the art to make and use my invention, I will now proceed to describe its construction and operation.

The outside of the box, B, is made circular, or of any desired form, and the interior constructed in the form of a disk, with the sides inclined, and raised a slight distance above the outside.

On one side of the box, and off from the centre, an opening, O, is made, which connects with the trunk leading to the gate G.

From the point p at the bottom of the box, and curved up along the side until it reaches the top, is a curved guide, C G, the upper portion of which inclines a short distance over the opening O.

In the centre, and at the bottom of the box, is placed a raised step, T, in which revolves a vertical shaft, S.

On this shaft is secured an inverted conical-shaped guide, S G, with its lower part resting on the step T.

The sides of the guide S G are made slightly curved, in order to effectually throw the water on to the buckets of the wheel W.

The wheel W is cast with or attached to the upper part of the conical guide S G, and the lower part rests slightly on and fits close to the flange or upper part of the box B.

The buckets of the wheel are made with any degree of curvature, and in any number desired.

Operation.

The water is entered at the gate G, and passes through the opening O, and strikes the inclined side of the box B, and follows around until it reaches the point p, where it will commence to ascend the curved guide C G, and also the cone-shaped guide S G, in the form of a spiral. When the water reaches the upper part of the curved guide C G, it leaves it and continues, in the form of a spiral, around the cone-shaped guide S G. Now, owing to the curvature of the sides of this guide, the water will pass off at all points on to the buckets of the wheel W. The water thus imparts motion to the wheel, and carries with it the cone-shaped guide S G. As this guide turns with the water, it is obvious there will be no friction. It will also be seen that no damage can occur to the wheel from sticks or other matter passing with the water, as the guide S G and the wheel W turn together. If otherwise, that is, the guide remained stationary and the wheel turned, sticks and other matter would get between them, and jam the wheel fast or break it.

I do not claim the use of spiral-guide curves; neither do I claim a wheel operated by the upward and outward motion of the water; but having thus fully described my invention,

What I claim therein as new, and desire to secure by Letters Patent, is—

The cone-shaped guide S G, secured upon and revolving with the wheel-shaft, in combination with the stationary curved guide C G, box B, and wheel W, the whole arranged and operating substantially in the manner described.

ROBERT BING.

Witnesses:
ISAAC R. OAKFORD,
HENRY ROELLIG.